Jan. 6, 1942.  W. P. PETERSON  2,268,774
BICYCLE LAMP SUPPORT
Filed March 22, 1941
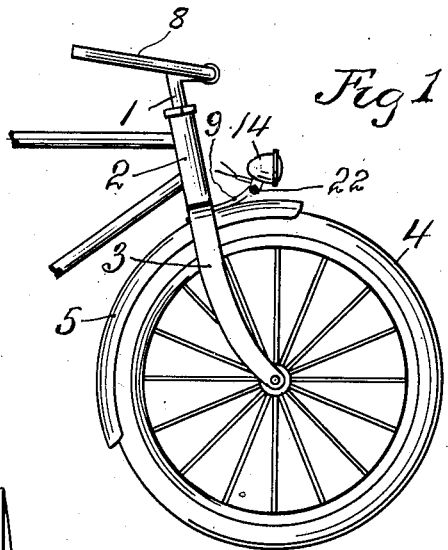
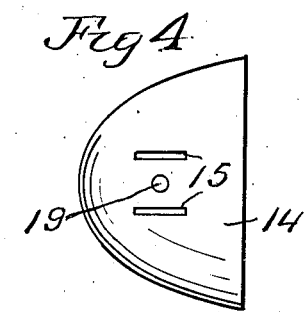
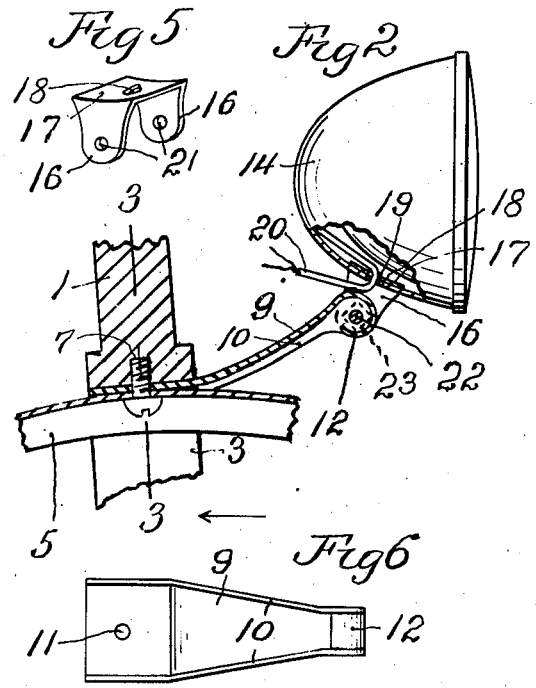
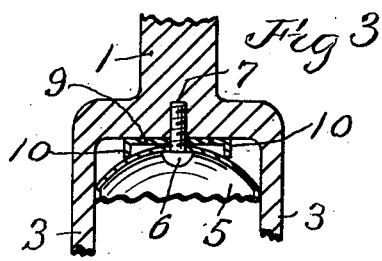
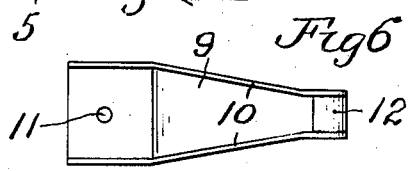
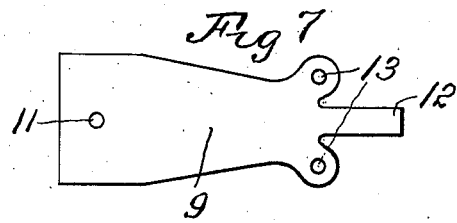
INVENTOR.
Wilber P. Peterson
BY Warren D. House
His ATTORNEY.

Patented Jan. 6, 1942

2,268,774

UNITED STATES PATENT OFFICE 2,268,774

BICYCLE LAMP SUPPORT

Wilber P. Peterson, Kansas City, Mo.

Application March 22, 1941, Serial No. 384,682

1 Claim. (Cl. 240—58)

My invention relates to improvements in bicycle lamp supports.

One of the objects of my invention is to provide a novel bicycle lamp support, which is very simple, cheap, strong, durable, not likely to get out of order, which can be attached to a bicycle steering post with the same means that is used to fasten the front wheel fender to the steering post, and which can be easily and quickly installed.

The novel features of my invention are hereinafter fully described and claimed.

In the accompanying drawing which illustrates my invention,

Fig. 1 is a side elevation of the front portion of a standard type of bicycle, including the front wheel, front wheel fender, steering post, and portions of the frame, my improved support being shown carrying a lamp and operatively installed.

Fig. 2 is an enlarged side view, showing portions of the steering post and front wheel fender in vertical section, the bracket being shown in vertical section supporting a lamp that is partly broken away.

Fig. 3 is a section on the line 3—3 of Fig. 2.

Fig. 4 is an under view of the lamp casing, lens removed, as are its supporting ears.

Fig. 5 is a perspective view of the supporting ears of the lamp.

Fig. 6 is an under view of the bracket.

Fig. 7 is a plan view of the blank from which the bracket is made.

Similar characters of reference designate similar parts in the different views.

1 designates the upper or shaft part of the usual steering post rotatably mounted in the barrel 2 of the bicycle frame, and having the usual downwardly extending fork arms 3 between which the front wheel 4 is rotatably mounted in the usual manner.

5 designates the usual concavo-convex front wheel fender having through it a hole through which extends a fastening screw 6, fitted in a threaded hole 7 in the lower end of the steering post 1. 8 designates the usual handle bars at the upper end of the steering post.

My improved lamp support comprises a bracket consisting of a channel shaped member 9 having downwardly extending flanges 10.

The rear end portion of the bracket has extending through it between the flanges 10 a hole 11, Figs. 6 and 7. The front end portion of the bracket has an arcuate tongue 12, which is concentric with two alined holes 13 respectively provided in the flanges 10. The ends of the arcuate tongue 12 abut respectively against the inner sides of the flanges 10.

14 designates the body of a usual bicycle lamp, the lower side of the body having two spaced apart parallel slots 15 through which respectively downwardly extend the ears 16 of an inverted U shaped clip 17 of sheet metal, welded to the inner side of the body 14, and having a hole 18 alined with a hole 19 in the body 14, through which holes extend a lamp electric cord 20, Figs. 2, 4 and 5.

The ears 16 embrace opposite sides of the front end portion of the bracket 9, the ears having respectively two holes 21 alined with the holes 13 of the bracket. A bolt 22, having a nut 23, extends through the holes 13 of the flanges 10 and the holes 21 of the ears 16, and holds the ears clamped to the bracket member 9.

In applying the bracket 9, the screw 6 is removed, and the rear end of the bracket is inserted, with its flanges extending downwardly, between the fender 5 and the lower end of the steering post 1, between the fork arms 3 thereof. The screw 6 is then inserted through the fender 5, hole 11 in the bracket 9, and threaded hole 7 in the post, and tightened therein. The bracket 9 is extended rearwardly between the arms 3 of the steering post 1, and fastened therebetween, as just described.

The lamp may then be operatively mounted on the bracket 9 by causing the ears 16 to embrace the front end portion of the bracket 9, and inserting the bolt 22 through the holes 13 of the bracket and the holes 21 of the ears 16, and tightening the nut 23 to firmly hold the lamp in the desired adjusted position. The bolt 22 provides a horizontal axis on which the lamp 14 may be tiltably adjusted to any desired angle, so that the light from the lamp will be projected the desired distance ahead.

By having the flanges 10 of the bracket 9 engaging the convex upper side of the fender 5, as shown in Fig. 3, the bracket 9 is held thereby from lateral pivotal movement on the securing screw 6. The flanges 10 further serve to stiffen the bracket, and also serve to support the bolt 22.

The arcuate tongue 12 by engaging the inner sides of the flanges 10, prevents the bolt 22 and nut 23 thereon from forcing the flanges inwardly, when a clamping pressure is exerted by the bolt and nut against the ears 16.

The screw 6 performs the double function of fastening the bracket to the steering post, and of fastening the fender 5 in its operative position. Also the fender 5 performs the double function of a fender and that of holding the bracket 9 against the lower end of the steering post 1 and from lateral swinging.

By attaching the bracket 9 to the lower end of the steering post 1, the space above the handle bars is clear and the lamp does not interfere with the forward view of the rider.

This positioning of the lamp and bracket places the lamp at so low a position that the rays projected from the lamp will strike the road at a short distance ahead, without having to deflect the lamp, and will afford efficient service with less liability of projecting a glaring light into the eyes of approaching riders or drivers, than would be the case were the lamp disposed at a greater altitude.

With the use of the large inflated tires on bicycles, as is now customary, the distance between the forks of the steering post is substantial. By having the longitudinal flanges of the bracket engaging the convex upper side of the fender at opposite sides of the medial line thereof, as shown, the width of the rear end portion of the bracket may be relatively narrow, and the bracket yet held from accidental lateral swinging, thereby cheapening the cost of construction.

Modifications of my invention within the scope of the appended claim, may be made without departing from the spirit of my invention.

What I claim is:

In a bicycle lamp support, in combination with a bicycle steering post having downwardly extending fork arms, a convex-concavo front wheel fender between said arms, and means for fastening said fender to the lower end of said post, of a channel shaped bracket having a rear portion between said fender and said post, the flanges of said bracket extending downwardly and engaging the convex upper side of said fender at opposite sides of the medial line thereof, said fastening means holding said fender, bracket and post clamped tightly together, said bracket forward of said post having means adapted to engage with and support a lamp.

WILBER P. PETERSON.